United States Patent
Wei et al.

(10) Patent No.: US 8,566,421 B2
(45) Date of Patent: *Oct. 22, 2013

(54) METHOD FOR CREATING AND PROVIDING LAYERED SYNDICATED DATA FOR MULTIMEDIA CONTENT TO USERS

(75) Inventors: Bin Wei, Basking Ridge, NJ (US);
Yih-Farn Chen, Bridgewater, NJ (US);
Rittwik Jana, Parsippany, NJ (US);
Serban Jora, Roanoke, VA (US);
Bernard Renger, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,275

(22) Filed: Jun. 11, 2012

(65) Prior Publication Data
US 2012/0254358 A1   Oct. 4, 2012

Related U.S. Application Data

(63) Continuation of application No. 12/778,681, filed on May 12, 2010, now Pat. No. 8,200,779, which is a continuation of application No. 11/613,030, filed on Dec. 19, 2006, now Pat. No. 7,720,932.

(51) Int. Cl.
*G06F 17/30* (2006.01)

(52) U.S. Cl.
USPC .................... 709/217; 715/200; 375/352

(58) Field of Classification Search
USPC ......... 709/217, 218–219, 201, 203, 206, 231, 709/236; 455/466, 456.1, 414.1, 412.1, 455/500, 517–519, 418–420; 715/202, 203, 715/204, 209, 234, 719, 727–728
See application file for complete search history.

(56) References Cited

U.S. PATENT DOCUMENTS

| | | | |
|---|---|---|---|
| 6,704,576 B1 * | 3/2004 | Brachman et al. | 455/503 |
| 7,870,125 B1 * | 1/2011 | Istvan et al. | 707/722 |
| 2005/0229097 A1 | 10/2005 | Lander | |
| 2006/0026067 A1 | 2/2006 | Nicholas et al. | |
| 2006/0129907 A1 * | 6/2006 | Volk et al. | 715/500 |
| 2006/0274869 A1 * | 12/2006 | Morse | 375/352 |

* cited by examiner

Primary Examiner — Ruolei Zong

(57) ABSTRACT

A layered syndicated feed or content is provided having layers defined according to a media type (e.g., text, graphic, audio, or video) wherein each layer has a plurality of levels such that each level provides either inclusive or exclusive content of the layer's media type in varying degrees of detail or depth. Furthermore, a system is provided for requesting and storing user and mobile device profiles indicative of the syndicated content layers and levels that the user is interested in receiving and that the user's mobile device is capable of receiving.

20 Claims, 4 Drawing Sheets

```
<rss version="2.0">
  <channel>
    <title>Liftoff News</title>
    <link>http://liftoff.msfc.nasa.gov/</link>
    <description>Liftoff to Space Exploration.</description>
    <language>en-us</language>
    <pubDate>Tue, 10 Jun 2003 04:00:00 GMT</pubDate>

<lastBuildDate>Tue, 10 Jun 2003 09:41:01 GMT</lastBuildDate>
    <docs>http://blogs.law.harvard.edu/tech/rss</docs>
    <generator>Weblog Editor 2.0</generator>
    <managingEditor>editor@example.com</managingEditor>
    <webMaster>webmaster@example.com</webMaster>

<item>
      <title>Star City</title>
      <link>http://liftoff.msfc.nasa.gov/news/2003/news-starcity.asp</link>
      <description>How do Americans get ready to work with Russians aboard the
        International Space Station? They take a crash course in culture, language
        and protocol at Russia's Star City.</description>
      <pubDate>Tue, 03 Jun 2003 09:39:21 GMT</pubDate>
      <guid>http://liftoff.msfc.nasa.gov/2003/06/03.html#item573</guid>
    </item>

<item>
      <title>Space Exploration</title>
      <link>http://liftoff.msfc.nasa.gov/</link>
      <description>Sky watchers in Europe, Asia, and parts of Alaska and Canada
        will experience a partial eclipse of the Sun on Saturday, May 31st.</description>
      <pubDate>Fri, 30 May 2003 11:06:42 GMT</pubDate>
      <guid>http://liftoff.msfc.nasa.gov/2003/05/30.html#item572</guid>
    </item>

<item>
      <title>The Engine That Does More</title>
      <link>http://liftoff.msfc.nasa.gov/news/2003/news-VASIMR.asp</link>
      <description>Before man travels to Mars, NASA hopes to design new engines
        that will let us fly through the Solar System more quickly.  The proposed
        VASIMR engine would do that.</description>
      <pubDate>Tue, 27 May 2003 08:37:32 GMT</pubDate>
      <guid>http://liftoff.msfc.nasa.gov/2003/05/27.html#item571</guid>
    </item>

<item>
      <title>Astronauts' Dirty Laundry</title>
      <link>http://liftoff.msfc.nasa.gov/news/2003/news-laundry.asp</link>
      <description>Compared to earlier spacecraft, the International Space
        Station has many luxuries, but laundry facilities are not one of them.
        Instead, astronauts have other options.</description>
      <pubDate>Tue, 20 May 2003 08:56:02 GMT</pubDate>
      <guid>http://liftoff.msfc.nasa.gov/2003/05/20.html#item570</guid>
    </item>
  </channel>
</rss>
```

(PRIOR ART)

FIGURE 1

```
<rss version="2.0"
     xmlns:media="http://search.yahoo.com/mrss/"
     xmlns:layer="http://mxm.at.com/lrss/"
                                            122
<channel>
<title>Layered RSS sample</title>
<link>http://myurl.com/sample</link>
<description>lrss sample</description>
  <item>
    <title>layered video</title>
    <media:content url="myurl.com/SoccerGameXYZ_allgoals.wmv medium="video"
          layer:layer="game" layer:level="1" layer:included="2"/>
                                        126
    <media:content url="myurl.com/SoccerGameXYZ_allgoalattempts.wmv medium="video"
          layer:layer="game" layer:level="2" layer:included="3"/>
    <media:content url="myurl.com/SoccerGameXYZ_wholegame.wmv medium="video"
          layer:layer="game" layer:level="3"/>
  </item>
</channel>
</rss>
```

METHOD FOR CREATING AND PROVIDING LAYERED SYNDICATED DATA FOR MULTIMEDIA CONTENT TO USERS

RELATED APPLICATION

The present application is a continuation of U.S. patent application Ser. No. 12/778,681, filed May 12, 2010, now U.S. Pat. No. 8,200,779, which is a continuation of U.S. patent application Ser. No. 11/613,030, filed Dec. 19, 2006, now U.S. Pat. No. 7,720,932, the contents of which is incorporated herein by reference in its entirety.

TECHNICAL FIELD OF THE INVENTION

Embodiments of the present invention provide a layered syndicated content representation that can be used to compose content which is suitable for a user's device comprising information at a level of detail selected by the user. An embodiment of the present invention formats multimedia content into one or more layers, each layer comprising of levels within. Each layer is identified by a name and is associated with one media type namely audio, video, text etc. Levels within a layer can be further decomposed into finer detail with respect to the chosen parent media type (eg.

```
<item>
    Layer1 (text)
    Layer2 (audio)
        Level2_1 (audio sub version)
        Level2_2
    Layer3 (video)
        Level3_1 (video sub version 1)
        Level3_2
        Level3_3
</item>
```

A layer may be a viewpoint of an observed event item or an entry of that event described in a media type. Levels are content of the same event item that may be organized in an increasing order of detail within a layer. This hierarchical notion of layers and levels is conceptualized as a Meta structure for media representation and may be explained in the context of RSS as an embodiment in the later section of the invention description.

BACKGROUND OF THE INVENTION

The emergence of content syndication technologies such as RSS (Really Simple Syndication) and weblogs (a.k.a. blogs) has helped transform the web into an interface platform that competes with traditional news media for timely content publication, aggregation, and delivery. RSS is a web content syndication format and a dialect of XML. All RSS files must conform to the XML 1.0 specification, as published in the World Wide Web Consortium (W3C) web site.

The creation and user consumption of timely blog updates are done, for the most part, manually, on desktop computers today. Moreover, many valuable information sources are not yet available as or integrated with RSS sources or other blogging tools. Furthermore, mobile users want to be able to fully participate in the web 2.0 phenomena by having the ability to publish and access timely newsworthy updates directly from their mobile devices.

The emergence of using RSS technologies along with weblogs to spread timely and personalized information on the Internet has presented challenges to traditional news and media industries. More and more Internet users are finding that they can acquire information updates from RSS sources and blog sites faster and easier than before, rather than remembering to fetch updates on a daily basis. Bloggers can configure their RSS browser to automatically check for specified news updates. Since the update's format is machine readable, the site can present the results in a summarized format for display to the bloggers. This acquisition and display process (e.g., displaying news headlines with individual items sorted by time) allows a user to completely customize a fetched site and have it automatically updated on an ongoing basis. Presently, a desktop user can easily use an Internet based browser such as Flock (http://www.flock.com), with an imbedded RSS reader, to aggregate several RSS feeds (such as news sources from CNN, CNET News, New York Times, etc.) An aggregator or news aggregator is a type of computer program (such as application software or a web application) that collects syndicated web content, such as RSS information and XML feeds from weblogs or other RSS sources.

As discussed above, RSS is a format for syndicating content of news-like sites, including major news sites like Wired, CNN, Wall Street Journal, and personal weblogs. RSS is not just for news. Just about any content can be divided into discrete items or entries that can be syndicated via RSS. That is, content that can be composed of text media, video media, audio media, and image media can also be published in a RSS content format. When information about an RSS item is placed in RSS format, an RSS-aware program can check the feed periodically for desired information updates and react to the desired information by accessing or extracting the information and providing it to a user on, for example, his or her personal computer.

Looking at a brief history of RSS, the name "RSS" is an umbrella term for a format that spans several different versions of at least two different (but parallel) formats. The original RSS, Version 0.90, was designed by Netscape as a format for building portals of headlines to mainstream news sites. This original RSS was deemed overly complex for its goals; a simpler version, 0.91, was proposed at Netscape and subsequently dropped when Netscape lost interest in the portal-making business. But, 0.91 was picked up by another vendor, UserLand Software, which intended to use this version of RSS as a basis of its weblogging products and other web-based writing software.

In the meantime, a third non-commercial group split off and designed a new format of RSS. This new format, which is based on RDF, is called RSS 1.0. Note that, UserLand was not involved in designing this 1.0 format and, as an advocate of simplifying 0.90, UserLand was not happy when RSS 1.0 was announced. Instead of accepting RSS 1.0, UserLand continued to evolve the 0.9x branch of RSS through versions 0.92, 0.93, 0.94 and finally 2.0.

Essentially an RSS feed, regardless of its version, comprises a channel, which has a title, link, description, and (optionally) a language designation, followed by a series of items. Each of the items following the channel comprises at least a title, a link and a description of the content.

Present day RSS content is created mostly for a desktop computer environment. Mobile device users would like to obtain RSS feeds through their mobile devices, but many forms of RSS content are unsuitable for presentation to mobile users on their devices because of the resource constraints of a user's mobile device. Furthermore, a mobile user would like to control the level of content detail according to his or her individual needs or interests. Sometimes a user may want a brief amount of content; however, sometimes the user may want more detailed content. Since present-day RSS content only provides a single level of content detail for each item within an RSS feed, direct RSS content adaptation to mobile device formats does not provide an adequate solution for providing RSS content to mobile devices with the flexibility required by the users and their devices.

Thus, what is needed is a type of syndicated content format that is managed in layers of content, wherein each layer may be formatted for a different type of data content and wherein the layers may also contain levels of varying content-detail so that different content formats of different levels of detail can be provided or generated for a mobile device according to user's preferences and to the mobile device's constraints and limitations.

SUMMARY OF THE INVENTION

The advantage of layers with levels containing different content detail is that the mobile user can request for more information depending on his or her interests. Because the mobile device may have bandwidth limitations, the mobile user may first retrieve a low bandwidth version of content such as text. Subsequently, the mobile user can ask for another layer of detail with another media type such as image, audio, or video.

Embodiments of the present invention provide syndicated content that is managed in layers of content wherein each layer has varying levels of content detail. This is done so that different levels of detail and formats can be provided and generated based on a user's profile and on a profile of the user's mobile devices that indicates the limitations and constraints thereof. The final content presented to a user can be a composite from levels of information in each layer. A content selection phase may occur where appropriate layers and levels are automatically constructed on behalf of the user and presented to the user that pertains to his or her device, implementing the concept of browsing with layered syndicated content. The level selection can be done independently across different layers.

In one embodiment of the invention, a method of providing content in a syndicated representation is provided wherein generic content is formatted, by a module, into one or more layers. Each of the layers comprises a layer name, a designation of media type, a number of levels in the layer, and media content, of the media type, separated into the designated number of levels. In additional embodiments, each of the layer elements may further comprise a tag that designates whether each level within its layer comprises content that is inclusive content or exclusive content with respect to the other levels in the same layer.

In another embodiment of the present invention, a format is provided for layered RSS content. The format comprises a layer element wherein the layer element comprises a layer name, a number of levels in the layer element, RSS content in at least one of the number of levels, and a tag that indicates whether the RSS content in each of the number of levels is inclusive content or exclusive content.

In yet another embodiment of the invention, a system for providing syndicated content to a user's mobile device is provided such that the syndicated content is extracted from layered syndicated content in accordance with a user's preferences and the user's device's capabilities. The system comprises a device profile database for storing the user's device profile, a user profile database for storing the user's preference information, a layered syndicated content creation module for generating layered syndicated content from a content source, and a content server that transforms the layered syndicated content into the user requested syndicated content in accordance with both the user's device profile and the user's interest profile.

In yet another embodiment of the invention, a method for providing RSS content to a user's mobile device is provided by constructing a layered RSS content wherein the layered RSS content comprises at least one layer wherein the layer comprises at least one level of RSS content detail. The method further comprises reading a user's device profile and a user's profile and then transforming the layered RSS content into user requested RSS content that meets the requirement of the user's profile and the requirement of the user's device profile. The content composition can also be conducted based on user's interactions or available resources such as network bandwidth.

It is understood that the above summary of the invention is not intended to represent each embodiment or every aspect of the present invention.

BRIEF DESCRIPTION OF THE DRAWINGS

A more complete understanding of the method and apparatus of the present invention and the advantages thereof may be obtained by reference to the following detailed description when taken in conjunction with the accompanying drawings wherein:

FIG. 1 illustrates a current RSS 2.0 feed;

FIG. 3 illustrates an exemplary format for layered RSS with Media RSS; and

DETAILED DESCRIPTION OF THE INVENTION

Figure 2:
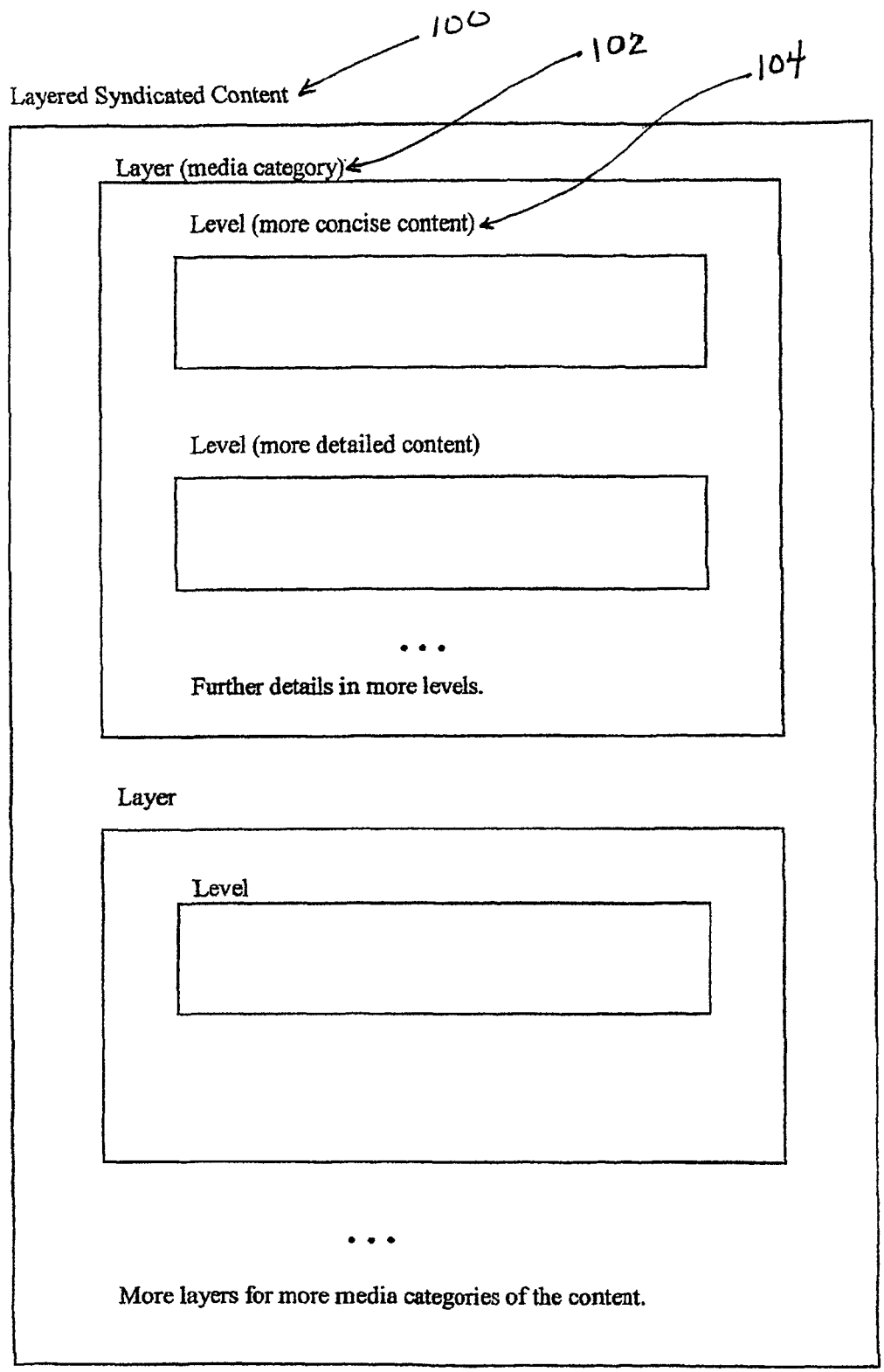
FIG. 2 illustrates the concept of layered syndicated content.

Referring now to the drawings, wherein like reference numbers are used herein to designate like elements throughout the various views, embodiments of the present invention are illustrated and described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Various embodiments of the invention provide a layered RSS format that supports a method of managing RSS data so that conventionally formatted RSS feeds can be provided to a user's mobile device or other RSS reader in accordance with the limitations of the user's mobile device as well as the user's selection of the type and detail level of the data to be received.

Embodiments of the present invention extend the conventional RSS feed structure or create a new RSS feed structure version that includes layers and levels of data. The layers each have a layer name and designate a type of media content that is in the layer. Media content types can include text, images, video, or audio content. Within each layer there may be a number of levels. Each level within the layer may contain a different degree of media content detail for the media type in the particular layer.

With the popularity of RSS and its wide use on the Internet, it follows that mobile device users would like to obtain RSS feeds through their mobile devices. Many RSS feeds become very important to a user who wishes to receive time-sensitive information. One drawback of current mobile devices is that the time required for downloading detailed RSS feeds is excessive. That is, most RSS content is created for the desktop computer environment and some forms of content are not suitable or adaptable for presentation on a mobile device due to various device limitations. Existing RSS content is too detailed or lengthy for a time sensitive user to wait for. Also, mobile users may want varying amounts or levels of detail with respect to the RSS information or the RSS content topic that is being downloaded to their mobile device.

To better explain the exemplary embodiments of the invention, it may be best to take a step backward and review various current RSS feed methods. Referring to FIG. 1, an RSS feed 10 is depicted. This RSS feed 10 is constructed in the RSS version 2.0 format. RSS formats are specified in XML, which is a generic specification for data formats. RSS information is delivered as an XML file, which may be called an "RSS feed," a "web feed," an "RSS stream," or an "RSS channel."

Currently, an RSS channel has a fairly short list of required elements. That is, an RSS channel is required to have a title 12 and a link 14. The title 12 is the name of the channel. The channel name may be any name that people are to use in order to refer to the RSS channel or information service. The link 14 is generally the URL to a web site that corresponds to the channel. Another required element of a channel is the description 16, which is a phrase or sentence that briefly describes the channel contents.

There are a variety of optional channel elements in current RSS feeds. Such optional channel elements include the language 18 that the channel is written in, a copyright element (not shown here) that provides a copyright notice for the content in the channel. A managingEditor element 28 that may include an email address to a person or entity responsible for the content of the channel. A webMaster element 30 that provides an email address of a person or entity responsible for technical issues that relate to the channel. A pubDate element 20 that provides the publication date of the content in the channel. A lastBuildDate element 22 that provides the date and time that the content of the channel was last modified. A category element (not shown here) may specify one or more topic categories that the channel might belong to; for example, a newspaper, a periodical or a fiction category. A generator element 24 may be used to indicate the program that was used to create or generate the channel's contents. A docs element 26, in an RSS feed, is generally a URL that points to the organizational documentation that describes the planned or standardized format that is used in the RSS file.

A cloud element (not shown here) indicates where a process may register to be notified of updates to the channel, thereby implementing a light-weight publish-subscribe protocol for RSS feeds. There may be a TTL element (not shown here), which represents the number of minutes indicating how long a channel can be cached before it can be refreshed from the source. TTL basically stands for Time that the data is To Live. An image element (not shown here) can be used to specify a gif, jpeg, or png image format used for the images displayed with the channel. A rating element (not shown here) is a PICS rating for the channel. There may also be a text input element (not shown here) that specifies a format for a text input box that can be displayed along with the channel.

There also may exist a skip hour element (not shown here) or skip day element (not shown here). Each provides a hint for RSS aggregators to help them determine the number of hours or days they can skip aggregation of the contents in the RSS channel.

Still referring to FIG. 1, the RSS feed 10 includes a plurality of item elements 32. The item elements may represent a "story" or column contained in the channel 10. Each item 32 will have a title 34, which is the title of the item; a link 35, which provides a URL of the item; and a description 36, which provides an item synopsis or brief description of what is contained in the item 32 much like an abstract. Each item 32 may also contain a pubDate element 38, which provides the publication date of the contents in the item. A guide element 40 provides a string that uniquely identifies the item.

Other elements that may be in a current RSS 2.0 feed include a category element (not shown here) that would include the particular item 32 in one or more categories; an enclosure element (not shown here) that describes a media object that is attached to the item; and a source element that provides the name of an RSS channel that the item was originally sourced from.

When a current RSS feed 10 is received by an electronic device for display to a user, each item 32 is provided in its entirety, as designated by the URL link to the user. If there is an audio layer in the item 32, the user will hear it, if there is a jpeg (image) or mpeg (video) portion in the item 32 it will also be displayed or played to the user. In essence, the user may not select or limit the different modalities of content that may be provided in the multiple items 32 in the received RSS feed. The user's computer or device will attempt to display all of the RSS content, or at a minimum, a listing of the various RSS items by title, among other options.

Now in a generic exemplary format, referring to FIG. 2, a block diagram illustrating an exemplary embodiment of a layered syndicated content is depicted. The layered syndicated media content 100 comprises multiple layers and levels in a hierarchical structure. Different media types may be captured within the scope of layers. A layer 102 can be of any media type: text, image, audio, video, etc. In each layer, content can be described in levels. A level 104 is a place where content of certain detail is located. Information from multiple levels of the same layer can be composed with the flexibility of acquiring different levels of details. The final media representation comprises information from multiple layers.

A layer is related to media type and a level is related to content detail. As an exemplary explanation, for a text layer, the first or top level can be a highlight or an abstract of a story; the next level can be the story in a concise format; a next level could include the full story. For an image layer, for example, the top level may be an outline of the figures in the image; the next level may be the main objects appearing in the image; and the full image may be available at a next lower level. For an audio layer of a song as an example, one level may be the voice of the singer(s); another level may be the sound of music instruments; and a third layer may be the combination of the singer's voice(s) and the music. For a video layer, the first level contains the main events happening in the video; the next level can be key frames at some interval; at a lower level, a full length video of the same content is available. As the examples indicate that breaking down multimedia content into levels is not creating identical replicas which have different coding characteristics.

The relationship between adjacent levels determines how the content is composed. In an embodiment where content of a level is included in its lower level, as in the text example above, a layer of requested detail is from the content of the corresponding level. In yet another embodiment where different levels are exclusive, such as the audio example above, a layer may need a composition from the content of different levels. If the audio formats are different across the levels, a transcoding process is needed for authoring multiple levels.

By providing varying levels of detail in the differing levels of each layer, the layered syndicated content may be used according to a user's preference or a user's device capability by enabling the user or device to designate the layer and level of content to send to the user's device. A user may be interested in a Jazz music channel. The user may select an audio layer from a Jazz music channel but the user's device may not have enough storage for the entire song. As such, the user's device may designate or limit a download to a level, within the user selected layer, which requires less memory than entire songs and can be received by the user's device.

Referring still to FIG. 2, a layer name is used to define a layer in layered syndicated media content. The total number of levels can also be provided explicitly or inferred implicitly. Each level also contains the attributes, such as media format, whether the relationship between levels is inclusive or exclusive. This attribute provides the information when content composition is performed. It provides the flexibility for users to acquire content incrementally.

FIG. 3 depicts an exemplary layered RSS as an extension of Media RSS. In this embodiment, a layer of a soccer game video is described, wherein layer 122 is a new namespace for presenting content elements in layered RSS. The set of <media:content> elements within an item with the same value for the "layer" attribute indicates that those media pieces are semantically related. Level 124 indicates a level of detail within a layer. The combination of layer and level makes a unique identifier. Item 126 (layer:included="2") indicates, if from a details perspective, that a level is included in another level. The exemplary item 120 comprises a layer having three video levels. In this example, in level 1, the video content 128 comprises of media that includes only video of the soccer goals from game XYZ. In level 2, the video content 130 includes all of the goal attempts from game XYZ, which includes all of the goals in the video content 128. Furthermore, in level 3, the video content 132 includes more detailed content which, in this example, is the entire XYZ soccer game.

Similarly, audio and image content can be provided in different layers. Each layer may have a plurality of levels in a similar manner as the video content, above, is provided. For example, graphic content may have increased resolution or an increased amount of content.

When information from layered RSS content is to be delivered to a user, the user may designate a level number for all the needed or desired layers. As such, the layered RSS content would be delivered to the user by using the standard "enclosure" mechanism or extensions such as MediaRSS. Only the designated layer-level is sent to the user, not all the layers and all the related levels. Furthermore, a user could choose different levels from different layers in a channel for delivery to his or her mobile or other user's device in accordance with their needs and in accordance with the limitations of their mobile device. For example, the user may need text-based RSS at a level 3 for the same channel that video is being provided on the same topic, but the user may only want level 2 of the video feed layer.

Figure 4:
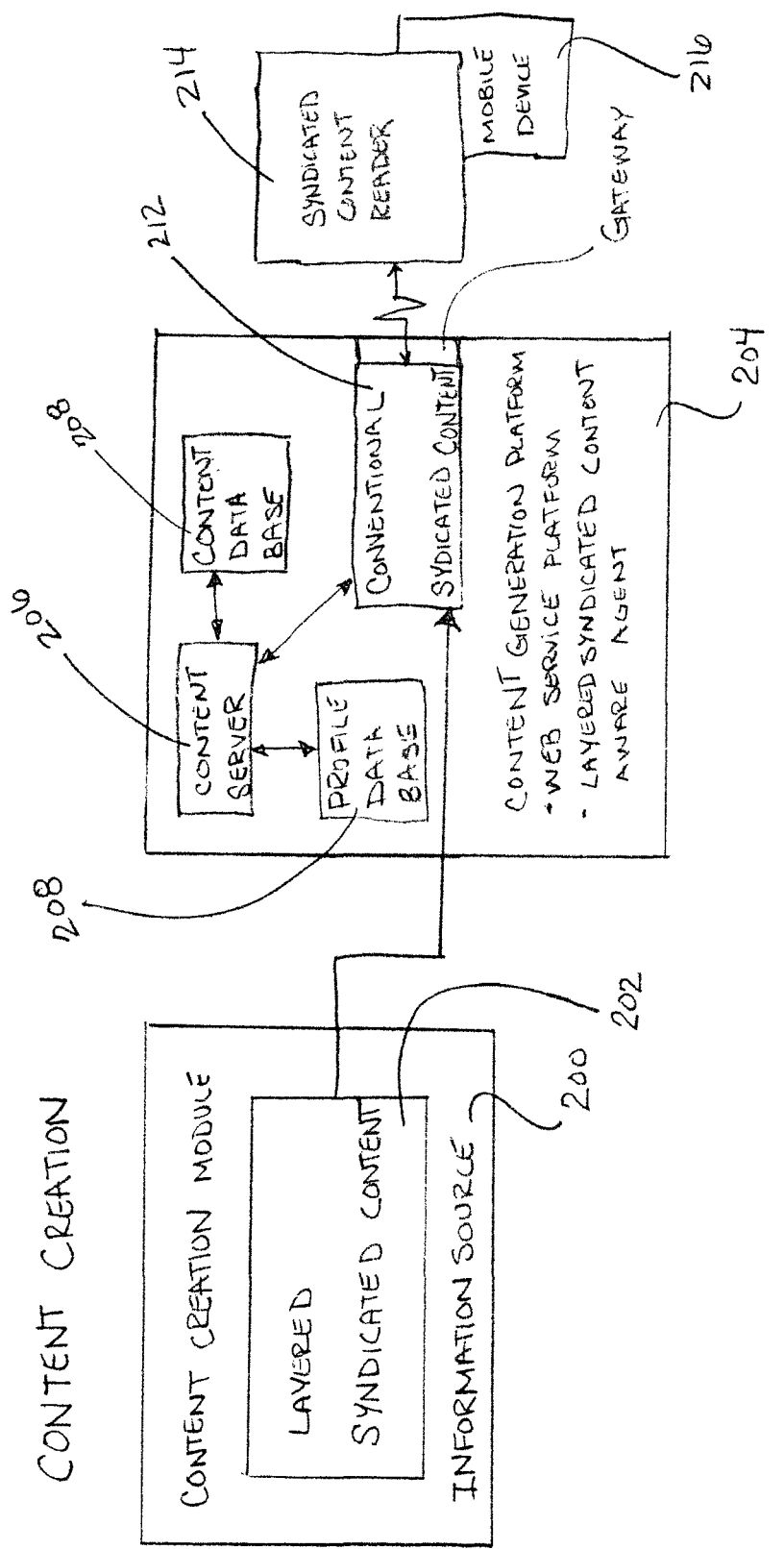
FIG. 4 illustrates a block diagram of an exemplary system that utilizes a layered RSS feed format.

The content of user/device designated layers and levels can be extracted from the originating layered syndicated information source and then constructed or aggregated into a regular syndicated format. Referring now to FIG. 4, syndicated content according to a layered information structure is created in a content creation module 200. The layered syndicated content 202 is then provided to a content generation web service platform 204. The content generation platform 204 comprises a content server 206, a content database 208 and a profile database 210. The profile database 210 includes a profile of each particular user and includes the user designated layers and levels of layered syndicated content that a user is interested in receiving. A user's profile contains one or more user selectable attributes which can be used to reconstruct the final content to the users. The profile database 210 also stores the user's mobile device constraint and limitation information. Such constraint and limitation information includes the types and formats of syndicated data that can be received and displayed by the user's mobile device 216 using the mobile device syndicated content reader 216.

When the layered syndicated content 202 is created at the content creation module 200, layer and level information is included with the corresponding content. The content of user selected layers and levels can then be extracted from the original layered syndicated source feed 202 and constructed, by the content generation web service platform 204, into a conventional syndicated format 212. The user requested content is a composite of layered syndicated content that conforms to the user's and device's profiles.

In one exemplary embodiment, syndicated content is delivered to a mobile user's syndicated content reader 214. The top level of syndicated content text can be pushed to the user's mobile syndicated content reader 214. Options can be provided to the user, via the mobile device 216, for access to other layers and levels of content. The user may choose, using a graphic or audio interface, a different layer and level based on their interest in the initial syndicated content feed. The profile database 210 may be used to appropriately select other layers and levels based on the limitations of the user's mobile device 216 and request the same in order to obtain further related syndicated content information on demand from the content generation web service platform 204. In another embodiment, it is also possible to provide links to the user such that the user can follow the links to select a content layer and levels that he or she wants to receive on their syndicated content reader 214.

Further, in additional embodiments when additional information is requested by a user's mobile device, be it a more detailed level of information or a different layer related to the same information, an embodiment of the invention may provide the user only the difference (the new information that has not been sent to the user yet) over the network in response to the user's request. In additional embodiments of the invention, the layered structure of syndicated content feeds may also accelerate searches for relevant content by focusing on a particular layer that is needed or requested by a user. For example, a keyword search may only be processed in the most important layer where the most concise or condensed information is maintained. Such a keyword search may only take place in the level 1 of a text layer or a jpg frame level within a particular layered syndicated content channel.

In other embodiments of the invention, the user, by requesting specific layers and levels, will have the content generation web service platform 204 generate the requested contents in segments. The segments may be combined to produce the final syndicated content for the user in accordance with the user's preferences. The content may also be created in segments in accordance with the available features and limitations of the user's syndicated content reader, such as the case of 216. If the user's mobile device does not play video clips, then video content would not be sent to the user's syndicated content reader 216, even if the user requested it.

Embodiments of the present invention that provide layered syndicated feeds will provide mobile users the ability to obtain and retrieve adequate syndicated content with devices having different modalities and limitations. This is important because different users may be interested in different levels of detail of the same syndicated content. The exemplary layered syndicated feed and the system for providing its content to users provides a way to satisfy the different interest levels of different users in the same content.

It should be understood that embodiments of the present invention in its implementation in the context of RSS are different from hierarchical RSS because hierarchical RSS was created for the purpose of helping to relate one set of RSS data to another set of RSS data so that multiple sub-events are conveyed with the main event. Hierarchical RSS does not provide or contain the notion of layers and levels of content from which an RSS feed is composed dynamically in order to satisfy the resource limitations of a target mobile or non-mobile RSS reader device 214/216.

It will be appreciated by those skilled in the art having the benefit of this disclosure that this invention provides a system for creating and providing layered syndicated content having layers defined according to the media type or modalities contained therein (i.e., text, graphic, audio, video) wherein each layer has a plurality of levels such that each level provides either inclusive or exclusive content of the layer's media type in varying degrees of detail or depth. Furthermore, embodiments of this invention provide a means for requesting and storing user and user's mobile device profiles that indicate the syndicated content layers and levels that the user is interested in receiving and that indicate the user's mobile device's constraints and limitations with respect to the types of syndicated content that can be received. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the creativity and scope of this invention, as defined by the following claims. Thus, it is intended that the following claims be interpreted to embrace all such further modifications, changes, rearrangements, substitutions, alternatives, design choices, and embodiments.

What is claimed is:

1. A method comprising:
   receiving a request for syndicated content from a user;
   identifying, from the request, an identity of the user;
   determining, based on the identity of the user, a user preference and a static capability of a user device; and
   generating layered syndicated content based on the user preference and the static capability of the user device, wherein each layer of the layered syndicated content has a degree of media content detail determined by one of the user preference and the static capability.

2. The method of claim 1, wherein the layered syndicated content comprises tags associated with each layer of syndicated content.

3. The method of claim 2, wherein the tags indicate one of a layer dependence on content found in a second layer and a layer independence on content found in the second layer.

4. The method of claim 1, wherein the syndicated content is one of a text media, a video media, an audio media, and an image media.

5. The method of claim 1, wherein the user device is a mobile device.

6. The method of claim 1, wherein each layer in the layered syndicated content comprises a different type of media content.

7. The method of claim 1, further comprising transmitting the layered syndicated content to the user device.

8. A system comprising:
   a processor; and
   a computer-readable storage medium having instructions stored which, when executed on the processor, cause the processor to perform operations comprising:
   receiving a request for syndicated content from a user;
   identifying, from the request, an identity of the user;
   determining, based on the identity of the user, a user preference and a static capability of a user device; and
   generating layered syndicated content based on the user preference and the static capability of the user device, wherein each layer of the layered syndicated content has a degree of media content detail determined by one of the user preference and the static capability.

9. The system of claim 8, wherein the layered syndicated content comprises tags associated with each layer of syndicated content.

10. The system of claim 9, wherein the tags indicate one of a layer dependence on content found in a second layer and a layer independence on content found in the second layer.

11. The system of claim 8, wherein the syndicated content is one of a text media, a video media, an audio media, and an image media.

12. The system of claim 8, wherein the user device is a mobile device.

13. The system of claim 8, wherein each layer in the layered syndicated content comprises a different type of media content.

14. The system of claim 8, the computer-readable storage medium having additional instructions stored which result in the operations further comprising transmitting the layered syndicated content to the user device.

15. A computer-readable storage device having instructions stored which, when executed by a processor, cause the processor to perform operations comprising:
   receiving a request for syndicated content from a user;
   identifying, from the request, an identity of the user;
   determining, based on the identity of the user, a user preference and a static capability of a user device; and
   generating layered syndicated content based on the user preference and the static capability of the user device, wherein each layer of the layered syndicated content has a degree of media content detail determined by one of the user preference and the static capability.

16. The computer-readable storage device of claim 15, wherein the layered syndicated content comprises tags associated with each layer of syndicated content.

17. The computer-readable storage device of claim 16, wherein the tags indicate one of a layer dependence on content found in a second layer and a layer independence on content found in the second layer.

18. The computer-readable storage device of claim 15, wherein the syndicated content is one of a text media, a video media, an audio media, and an image media.

19. The computer-readable storage device of claim 15, wherein the user device is a mobile device.

20. The computer-readable storage device of claim 15, wherein each layer in the layered syndicated content comprises a different type of media content.

* * * * *